May 4, 1965   R. V. FITZROY, JR., ETAL   3,182,244
ZEROING APPARATUS FOR INERTIALLY GUIDED PILOTLESS CRAFT
Filed Jan. 31, 1951
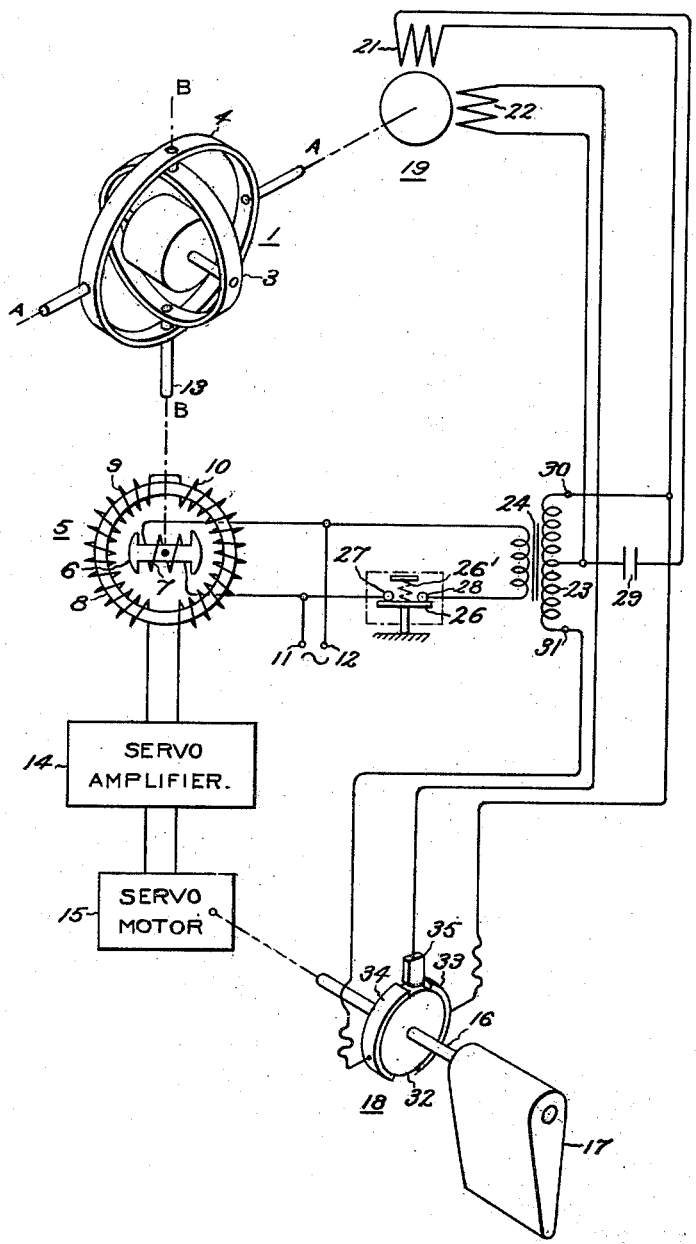
Inventors:
Roland V. Fitzroy, Jr.
James M. Cooper.
by
Their Attorney.

3,182,244
ZEROING APPARATUS FOR INERTIALLY
GUIDED PILOTLESS CRAFT
Roland V. Fitzroy, Jr., and James M. Cooper, both of Schenectady, N.Y., assignors to General Electric Company, a corporation of New York
Filed Jan. 31, 1951, Ser. No. 208,786
2 Claims. (Cl. 318—489)

This invention relates to pilotless craft and more particularly to a system for controlling the aerodynamic control surfaces of such a craft.

A large number of pilotless aircraft of the type commonly known as guided missiles employ a gyroscopic system to control the missile in flight. Such a system may effect control by means of a pick-off on the gyroscope which generates a signal representative of course deviation, and this signal is amplified and transmitted to a servo which in turn actuates the aerodynamic control surfaces of the craft so as to keep it on a desired course.

The missile is generally supported by a launching platform so that it is upright, and for a successful launching, it is essential that the control surfaces be in their neutral or streamlined position and that the control gyro be properly oriented with respect to the target and the vertical.

Heretofore, the control gyroscope and its pick-off has been zeroed at a time just prior to missile launching, but due to drift in the control amplifier circuits, as well as in the gyro, the control surfaces have wandered considerably since, due to the high sensitivity of the equipment, the control surfaces move many degrees for one degree of pick-off movement. This wandering has required a frantic and last-minute balancing of the amplifiers in order to insure exact alignment of the missile control surfaces at the moment of launching.

It is therefore an object of our invention to provide a simple system for insuring accurate alignment of the gyro reference axis and of the control surfaces of a pilotless aircraft up until the very moment of launching.

According to our invention, we have provided simple auxiliary apparatus whereby the actuating shaft of the missile control surface is provided with mechanical switch means adapted to detect physical movement of the control surface in either direction from a neutral position and to transmit a signal to a torque motor which signal will be of such a polarity as to cause the motor to precess the gyro in a direction which will restore the control surface to its neutral position. This control circuit remains operative only during the period prior to the missile take-off after which time our auxiliary circuit is automatically de-energized so as not to interfere with subsequent control of the missile either through normal operation of the gyro or in response to independent control signals through normal flight command channels.

The invention will be more fully understood by referring now to the accompanying drawing of a diagrammatic representation of our invention.

The conventional portion of a system for controlling the attitude of a missile in flight may normally comprise a gyro 1 having a rotor 2 rotated by any suitable motor means, not shown. The gyro is mounted in a conventional gimbal system comprising an inner gimbal 3 and an outer gimbal 4.

To obtain control voltages variable in polarity and magnitude in accordance with the displacement of the missile about a reference axis, there is provided a signal generator 5 which is of an inductive type comprising a rotor 6 having a primary or exciting winding 7 and a stator 8 having two differentially connected windings 9 and 10. The rotor winding is connected to alternating voltage supply lines 11 and 12. When the rotor of the signal generator is in the null position shown, the voltages induced in the stator windings cancel out, giving a zero output signal. If the rotor is displaced in one direction from the null position, a net voltage is induced in the stator windings which is in phase with the primary voltage. On the other hand, if the rotor is displaced in the opposite direction, a net stator voltage is induced which is 180° out of phase with the primary voltage. For rotor displacement in either direction from the null position, the voltage output of the stator windings varies approximately sinusoidally.

The rotor of the signal generator 5 is coupled directly to the inner gimbal 3 by means of a shaft 13, while the stator 8 is mounted in a case (not shown) so that it moves with the frame of the missile. Due to the fact that the gyro holds the rotor of the turn responsive signal generator 5 fixed in space while the stator rotates with the missile, it will be evident that the stator output voltage will vary in phase and magnitude in accordance with the direction of displacement of the missile from a predetermined fixed azimuth heading, and the magnitude of the voltage will vary with the amount of displacement.

The output of the signal generator 5 is transmitted to a servo amplifier 14 which may be of the type whose output is normally balanced but which becomes unbalanced in either of two opposite senses in response to the polarity and magnitude of alternating current control signals supplied to the input terminals. The normally balanced output of the servo amplifier 14 is transmitted to the servo motor 15 which directly effects rotation of the shaft 16 of the missile control surface diagrammatically represented at 17.

The arrangement thus far described is conventional and well known, and corresponding apparatus may be employed to actuate other control surfaces.

With the foregoing arrangement, the gyro 1 would normally maintain the control surface 17 in its neutral position, were it not for drift which occurs in the gyro 1 and in the amplifier 14 and causes the control surface to wander. According to our invention, we have provided simple auxiliary apparatus for overcoming the effects of drift and for thus maintaining the control surface 17 in perfect alignment, yet without detracting from the normal control functions of the gyroscopic system during flight.

Looking again at the drawing, the auxiliary apparatus comprises rotary selector switch 18 for detecting actual departures of the surface 17 in either direction from a neutral position and a reversible motor energized upon closure of the switch means 18 to rotate in a direction dependent upon the direction of operation of said rotary switch. The motor 19 is directly connected to the outer gimbal 4 of the gyro whereby a torque applied by the motor 19 will cause the gyro to precess, as will be hereinafter explained.

The torque motor shown is of the type having a solid rotor 20 and a two phase stator comprising a first winding 21 and a quadrature winding 22. The windings of the motor are energized from the secondary 23 of a transformer 24 having a primary winding 25 connected to alternating voltage supply lines 11 and 12. The supply circuit to the primary winding 25 is kept closed by a switch 26 so as to bridge a pair of contacts 27 and 28 until missile take-off but which is biased by a spring so as to open switch 26 and thereby de-energize the auxiliary circuit once the missile becomes airborne. With the primary winding energized, a voltage will be induced in the secondary winding 23 for energizing the motor 19 subject to closure of rotary selector switch 18.

Phase winding 21 of motor 19 is connected across one half of the transformer secondary 23, between the mid-tap and terminal 30, but through a phase shifting capacitor 29. The other phase winding 22 of motor 19 may be connected across the same half of the secondary 23 or across the other half between the mid-tap and terminal 31, depending upon the position of the rotary switch 18.

The selector switch 18 may be of any suitable type but in the preferred embodiment comprises an insulated drum 32 having two metal conductors 33 and 34 disposed about the periphery of the drum and spaced to have a slight gap therebetween. A contact 35 which may be of any suitable type such as a roller or a brush disposed in cooperative relationship between the two metal conductors such that when the surface 17 is in the neutral position the brush 35 does not touch either of the metal conductors but upon deflection of the control surface 17, the brush 35 will be brought into contact with one of the two metal conductors, depending upon the direction of deflection of the control surface. The brush 35 is directly connected via motor phase winding 22 to the mid-tap of the transformer secondary and the terminals 30 and 31 are connected to the metal conductors 33 and 34, respectively. Accordingly, selection of the rotary switch 18 by closure in one direction or the other determines the direction of rotation of the torque motor 19.

With the foregoing understanding of the elements and their organization, the operation of our invention will be readily understood from the following explanation. Just prior to takeoff the gyro 1 is properly oriented with respect to the course which the missile is to follow. This is done by shifting the gyro so that its spin axis is perpendicular to the plane of the trajectory and the outer gimbal axis is horizontal and in the plane of the target. The spin axis therefore lies in a horizontal plane, and due to the gyro's characteristic property of rigidity, the gimbal 3 tends to maintain its azimuth orientation in space. With the gyro 1 properly zeroed, the stator 8 of the inductive generator 5 may then be adjusted with respect to the rotor 6 so as to provide a signal which will cause the servo motor to rotate the shaft 16 until the control surface 17 reaches the desired streamlined or neutral position. In the absence of drift, the gyro 1 would normally maintain the surface 17 in its neutral position since there will now be no signal input to the servo amplifier. Because of drift, however, the surface 17 will be caused to deflect slightly in one direction, which we may assume, for purposes of explanation, as being clockwise whereby the brush 35 will contact the metal conductor 34. This will immediately result in energization of the torque motor 20 whereby a torque will be applied about the axis AA thus causing the gyro to precess about the axis BB as will be well understood by those skilled in the art. This in turn will cause the rotor 6 of the inductive generator 5 to rotate thereby generating a voltage which will be amplified at 14 and transmitted to the servo motor 15 thus causing the shaft 16 to rotate until the control surface 17 is returned to its neutral position at which point the brush 35 will reach the gap between the two metal conductors 33 and 34 and the torque motor 19 will become de-energized and rotation of the servo motor 15 will cease. If drift occurs in the opposite direction resulting in counterclockwise rotation of the control surface 17, the brush 35 will contact metal conductor 33 and gyroscopic precession will take place in the reverse direction thus causing the control surface to be restored again to its neutral position.

From the foregoing discussion, it will be clear that our invention eliminates the need for a separate gyro erection amplifier by using a single amplifier for gyro erection and drift correction prior to launching by employing this same amplifier as a control surface servo-amplifier after launching. It will also be apparent that this arrangement can be used for gyro erection and drift correction in all axes.

In order that the auxiliary apparatus will not interfere with subsequent control of the missile after it becomes airborne, disconnect means are provided for instantly divorcing the auxiliary apparatus from the remainder of the gyro control circuit when the switch 26 is opened. As shown schematically in the drawing, the switch member 26 is fixed to the launching platform and therefore, upon takeoff, the auxiliary apparatus becomes de-energized and operation of rotary selector switch 18 becomes ineffective.

While a particular embodiment of our invention has been illustrated and described, modifications thereof will readily occur to those skilled in the art. It should be understood that the invention is not limited to the particular arrangement disclosed but that the appended claims are intended to cover all modifications which do not depart from the true spirit and scope of the invention.

What we claim as new and desire to secure by Letters Patent of the United States are:

1. In a pilotless craft having a surface for controlling the movement of said craft about a control axis, position-maintaining means including a gyro for detecting angular movement of said craft about said control axis, servo-means responsive to said position-maintaining means for actuating said surface, and an energizable auxiliary circuit further comprising, switch means selectively responsive to movement of said surface in either direction from a predetermined position, a reversible torque motor connected to said gyro and responsive to apply torque in a direction dependent upon the direction of operation of said switch means whereby said gyro is precessed in a direction to restore the surface to its neutral position, and means for de-energizing said auxiliary circuit upon the launching of said craft.

2. In a pilotless craft having a control surface for controlling the movement of said craft about a control axis, a gyro for detecting angular movement of said craft about said control axis, servo means responsive to said gyro for actuating said control surface, and an energizable auxiliary circuit further comprising, a rotary selector switch connected to said control surface and having two conductors, and a brush disposed to contact one of said conductors upon departure of said surface from a neutral position, a reversible torque motor connected between said gyro and said rotary switch means and responsive to apply torque in a direction dependent upon the relative direction of movement between said conductors and said brush whereby said gyro is precessed by said motor so as to restore said control surface to its neutral position, and disconnect means for de-energizing said auxiliary circuit upon the launching of said craft.

No references cited.

JOHN F. COUCH, *Primary Examiner.*

RALPH R. YOUNG, *Examiner.*